(12) United States Patent
Dewan (10) Patent No.: US 8,213,618 B2
(45) Date of Patent: Jul. 3, 2012

(54) PROTECTING CONTENT ON CLIENT PLATFORMS

(75) Inventor: Prashant Dewan, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 483 days.

(21) Appl. No.: 12/319,034

(22) Filed: Dec. 30, 2008

(65) Prior Publication Data

US 2010/0169667 A1 Jul. 1, 2010

(51) Int. Cl.
*G06F 21/00* (2006.01)
*H04L 29/06* (2006.01)
*H04L 9/32* (2006.01)
*G06F 11/30* (2006.01)
*G06F 12/14* (2006.01)

(52) U.S. Cl. ......... 380/277; 713/155; 713/171; 713/189
(58) Field of Classification Search .................. None
See application file for complete search history.

(56) References Cited

U.S. PATENT DOCUMENTS

| | | | |
|---|---|---|---|
| 7,523,323 B2 | 4/2009 | Rothman | |
| 7,634,807 B2 * | 12/2009 | Yan et al. | 726/22 |
| 2005/0033972 A1 * | 2/2005 | Watson | 713/189 |
| 2005/0283601 A1 * | 12/2005 | Tahan | 713/2 |
| 2006/0184802 A1 | 8/2006 | Ibrahim et al. | |
| 2006/0256108 A1 | 11/2006 | Scaralata | |
| 2007/0006169 A1 * | 1/2007 | Iliev et al. | 717/131 |
| 2008/0244569 A1 | 10/2008 | Challener et al. | |
| 2009/0006862 A1 | 1/2009 | Alkove et al. | |
| 2009/0007104 A1 * | 1/2009 | Zimmer et al. | 718/1 |
| 2009/0049510 A1 * | 2/2009 | Zhang et al. | 726/1 |
| 2009/0089582 A1 * | 4/2009 | Brutch et al. | 713/171 |
| 2009/0092248 A1 * | 4/2009 | Rawson | 380/45 |
| 2009/0204806 A1 * | 8/2009 | Kanemura et al. | 713/155 |
| 2010/0082960 A1 * | 4/2010 | Grobman et al. | 713/2 |
| 2010/0106976 A1 * | 4/2010 | Aciicmez et al. | 713/189 |

FOREIGN PATENT DOCUMENTS

GB 2404537 A 2/2005

OTHER PUBLICATIONS

European Patent Office, Communication pursuant to Rules 70(2) and 70a(2) EPC and reference to Rule 39(1) EPC dated Jul. 19, 2010 in European application No. 09252828.0.

(Continued)

*Primary Examiner* — Shin-Hon Chen
(74) *Attorney, Agent, or Firm* — Trop, Pruner & Hu, P.C.

(57) ABSTRACT

A method, computer system, and computer-readable medium with instructions to provide a client security management layer and a content player that ensure that the content is protected from malware on the receiving computer system. The client security management layer controls access to a protected portion of a memory of a computer system on behalf of a component, such as the content player, running on the processor of the computer system. The client security management layer receives an encrypted content key from the component, confirms the integrity of the component, decrypts the encrypted content key to provide a decrypted content key, and places the decrypted content key in the protected portion of the memory in response to confirming the integrity of the component. Other embodiments are described and claimed.

32 Claims, 6 Drawing Sheets

OTHER PUBLICATIONS

Korean Patent Application, Notice of Preliminary Rejection mailed Mar. 18, 2011 in Korean application No. 10-2009-131216.

European Search Report received for European Patent Application No. 09252828.0, mailed on May 11, 2010, 7 pages.

Garfinkel et al., "Terra: A Virtual Machine-Based Platform for Trusted Computing", Proceedings of the ACM Symposium on Operating Systems Principles, SOSP'03, Oct. 19-22, 2003, pp. 193-206.

Japanese Patent and Trademark Office, Office Action mailed Jul. 12, 2011 in Japanese application No. 2009-289005.

European Patent Office, Office Action mailed Oct. 10, 2011 in European application No. 09 252 828.0-2212.

Korean Patent and Trademark Office, Office Action mailed Nov. 30, 2011 in Korean application No. 10-2009-131216.

Japanese Patent Office, Decision of Refusal mailed Jan. 10, 2012 in Japanese patent application No. 2009-289005.

* cited by examiner

PROTECTING CONTENT ON CLIENT PLATFORMS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

TECHNICAL FIELD

The present disclosure relates generally to protection of digital content.

BACKGROUND

Digital Rights Management is a challenge for the technology and entertainment industries. Each day, millions of dollars are lost by illegal downloading of movies and music files from the Internet. Solutions implemented thus far, such as Content Scrambling Schemes and Advanced Access Content System, have provided insufficient protection against these data losses.

Exacerbating these losses are complex and evolving attacks by malware seeking to gain control of computer systems and/or steal digital content. These attacks can take on a variety of different forms ranging from attempts to crash the software program to subversion of the program for alternate purposes. The protection of run-time data, such as a software program's code, configuration information, and/or keys that protect content in main memory and while in transit, is a particular challenge for the technology and the entertainment industry.

DETAILED DESCRIPTION

Embodiments of the present invention may provide a method, system, and computer-readable storage medium with instructions to protect content received from a content server and provide protection services for the receiving content player. A secure client platform provides an attestation of its integrity to the content server. This attestation of integrity includes attesting to the presence of a protected "known" content player as well as protection against software known as "content rippers," which are designed to steal content. The content server provides the content keys to the "known" content player that is integrity protected.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
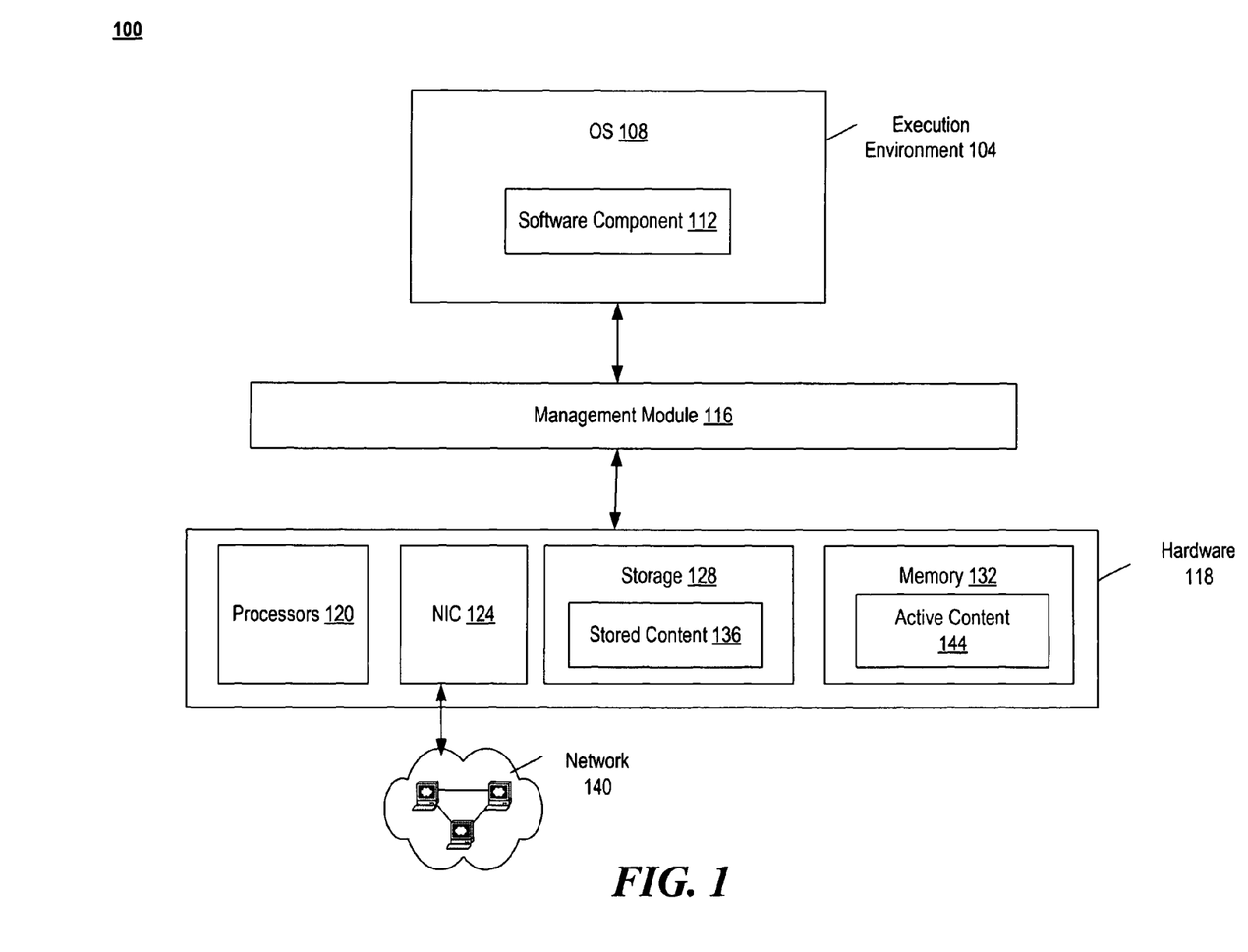
FIG. 1 illustrates a platform to provide protection for software components within an execution environment, in accordance with an embodiment of the present invention.

FIG. 1 illustrates a platform 100 to protect content received from a content server, in accordance with an embodiment of the present invention. The platform 100 may have an execution environment 104, which may be the domain of an executing operating system (OS) 108. The OS 108 may be a component configured to execute and control general operation of other components within the execution environment 104, such as the software component 112, subject to intra-partition memory access protections provided to selected components by an underlying management module 116, to be discussed in further detail below.

In some embodiments, the component 112 may be a supervisory-level component, e.g., a kernel component. In various embodiments, a kernel component may be services (e.g., loader, scheduler, memory manager, etc.), extensions/drivers (e.g., for a network card, a universal serial bus (USB) interface, a disk drive, etc.), or a service-driver hybrid (e.g., intrusion detectors to watch execution of code). Alternatively, in embodiments, the component 112 may be an application process, thread, or other user space program, service or library.

As used herein, the term "component" is intended to refer to programming logic and associated data that may be employed to obtain a desired outcome. The term component may be synonymous with "module" or "agent" and may refer to programming logic that may be embodied in hardware or firmware, or in a collection of software instructions, possibly having entry and exit points, written in a programming language, such as, for example, C++, Intel Architecture 32 bit (IA-32) executable code, etc.

A software component may be compiled and linked into an executable program, or installed in a dynamic link library, or may be written in an interpretive language such as BASIC. It will be appreciated that software components may be callable from other components or from themselves, and/or may be invoked in response to detected events or interrupts. Software instructions may be provided in a machine accessible medium, which when accessed, may result in a machine performing operations or executions described in conjunction with components of embodiments of the present invention. Machine accessible medium may be firmware, e.g., an electrically erasable programmable read-only memory (EEPROM), or other recordable/non-recordable medium, e.g., read-only memory (ROM), random access memory (RAM), magnetic disk storage, optical disk storage, etc. It will be further appreciated that hardware components may be comprised of connected logic units, such as gates and flip-flops, and/or may be comprised of programmable units, such as programmable gate arrays or processors. In some embodiments, the components described herein are implemented as software modules, but nonetheless may be represented in hardware or firmware. Furthermore, although only a given number of discrete software/hardware components may be illustrated and/or described, such components may nonetheless be represented by additional components or fewer components without departing from the spirit and scope of embodiments of the invention.

In addition to intra-partitioning selected components of the execution environment 104, the management module 116 may arbitrate general component access to hardware resources 118 such as one or more processor(s) 120, network interface controller (NIC) 124, storage 128, and/or memory 132.

The processor(s) 120 may execute programming instructions of components of the platform 100. The processor(s) 120 may be single and/or multiple-core processor(s), controller(s), application specific integrated circuit(s) (ASIC(s)), etc.

In an embodiment, storage 128 may represent non-volatile storage to store persistent content to be used for the execution of the components on the platform 100, such as, but not limited to, operating system(s), program files, configuration files, etc. In an embodiment, storage 128 may include stored content 136, which may represent the persistent store of source content for the component 112. The persistent store of source content may include, e.g., executable code store that may have executable files and/or code segments, links to other routines (e.g., a call to a dynamic linked library (DLL)), a data segment, etc.

In various embodiments, storage 128 may include integrated and/or peripheral storage devices, such as, but not limited to, disks and associated drives (e.g., magnetic, optical), universal serial bus (USB) storage devices and associated ports, flash memory, ROM, non-volatile semiconductor devices, etc.

In various embodiments, storage 128 may be a storage resource physically part of the platform 100 or it may be accessible by, but not necessarily a part of, the platform 100. For example, the storage 128 may be accessed by the platform 100 over a network 140 via the network interface controller 124.

Upon a load request, e.g., from a loading component or agent of the OS 108, the management module 116 and/or the OS 108 may load the stored content 136 from storage 128 into memory 132 as active content 144 for operation of the component 112 in the execution environment 104.

In various embodiments, the memory 132 may be volatile storage to provide active content for operation of components on the platform 100. In various embodiments, the memory 132 may include RAM, dynamic RAM (DRAM), static RAM (SRAM), synchronous DRAM (SDRAM), dual-data rate RAM (DDRRAM), cache, etc.

In some embodiments, the memory 132 may organize content stored therein into a number of groups of memory locations. These organizational groups, which may be fixed and/or variable sized, may facilitate virtual memory management. The groups of memory locations may be pages, segments, or a combination thereof.

A virtual memory utilizing paging may facilitate the emulation of a large logical/linear address space with a smaller physical memory page. Therefore, the execution environment 104 may provide a virtual execution environment in which the components may operate, which may then be mapped into physical pages of the memory 132. Page tables maintained by the OS 108 and/or management module 116 may map the logical/linear addresses provided by components of the execution environment 104 to physical address of the memory 132.

In various embodiments, the component 112, or portions thereof, may be selected for intra-partitioning to provide protection services to component 112. For example, component 112 may represent a content player to receive content from a content server. Management module 116 may identify and partition off portions of the component 112 to control access by the OS 108 or other components to the component 112. Partitioned portions may include any portion, up to all, of the particular component. A partitioned portion may be sequestered, either physically or virtually, from other components within the same execution environment, such that intra-execution environment accesses may be monitored and restricted, if necessary, by the underlying platform. Intra-partitioning may facilitate insulation of, e.g., component 112 from the OS 108, without requiring that the component 112 operate in an entirely separate execution environment, with a separate OS. Intra-partitioning may also afford the component 112 a level of protection from other components, even those of similar or higher privilege levels, within the execution environment 104 that may be compromised in some manner, e.g., by malware, rootkits, critical runtime failures, etc. Embodiments of this invention may provide for protection services while still allowing permitted interactions between the component 112 and other components, e.g., the OS 108, of the execution environment 104. Controlling access by the OS 108 to the component 112 may include various levels of access restrictions.

In various embodiments, intra-partitioning of components to protect content within an execution environment may be useful in a platform having multiple execution environments, such as virtual machines operating in a virtualization technology (VT) enabled platform. In such an embodiment, a management module may include, or be a part of, a virtual machine monitor (VMM).

Platform attestation of the hardware and a hypervisor has been defined in the Trusted Computing Group (TCG) standards body. The attestation mechanisms defined by TCG include providing attestations to the fact that "measured code" is running on the client platform. Code is "measured" by comparing the current version of the code to an original "gold standard" version of the code. Any variations in the code from the original "gold standard" are indications that the code has been subjected to tampering, perhaps having been overwritten by a virus or other malware.

Code that is typically measured for platform attestation under the TCG standards includes code such as the BIOS code that identifies and initializes system hardware components and hypervisor code. A hypervisor enables multiple operating systems to run on a host computer system, and is also referred to as a "virtual machine monitor." Measurements for platform attestation are not normally extended to the operating system or to application programs because of the myriad versions of operating systems and application programs available today. With so many versions of operating systems and application programs available, maintaining a confirmed original "gold standard" copy of each version of the code for comparison with the measured code is viewed as an unmanageable burden.

Patent application Ser. No. 11/229,126, entitled "Secure Vault Service for Software Components within an Execution Environment" and filed on Aug. 2, 2007, is assigned to the assignee of the present application and is incorporated by reference in its entirety herein. Patent application Ser. No. 11/229,126 describes a secure vault service that can be used to measure and protect operating system and application program components inside a virtual machine. The secure vault service is provided by a virtual machine monitor that runs at a higher privilege level than the operating system. Thus the secure vault service can protect data and program components even on a system where the operating system has been compromised. The virtual machine monitor providing the secure vault service is referred to herein as a "client security management layer."

Figure 2:
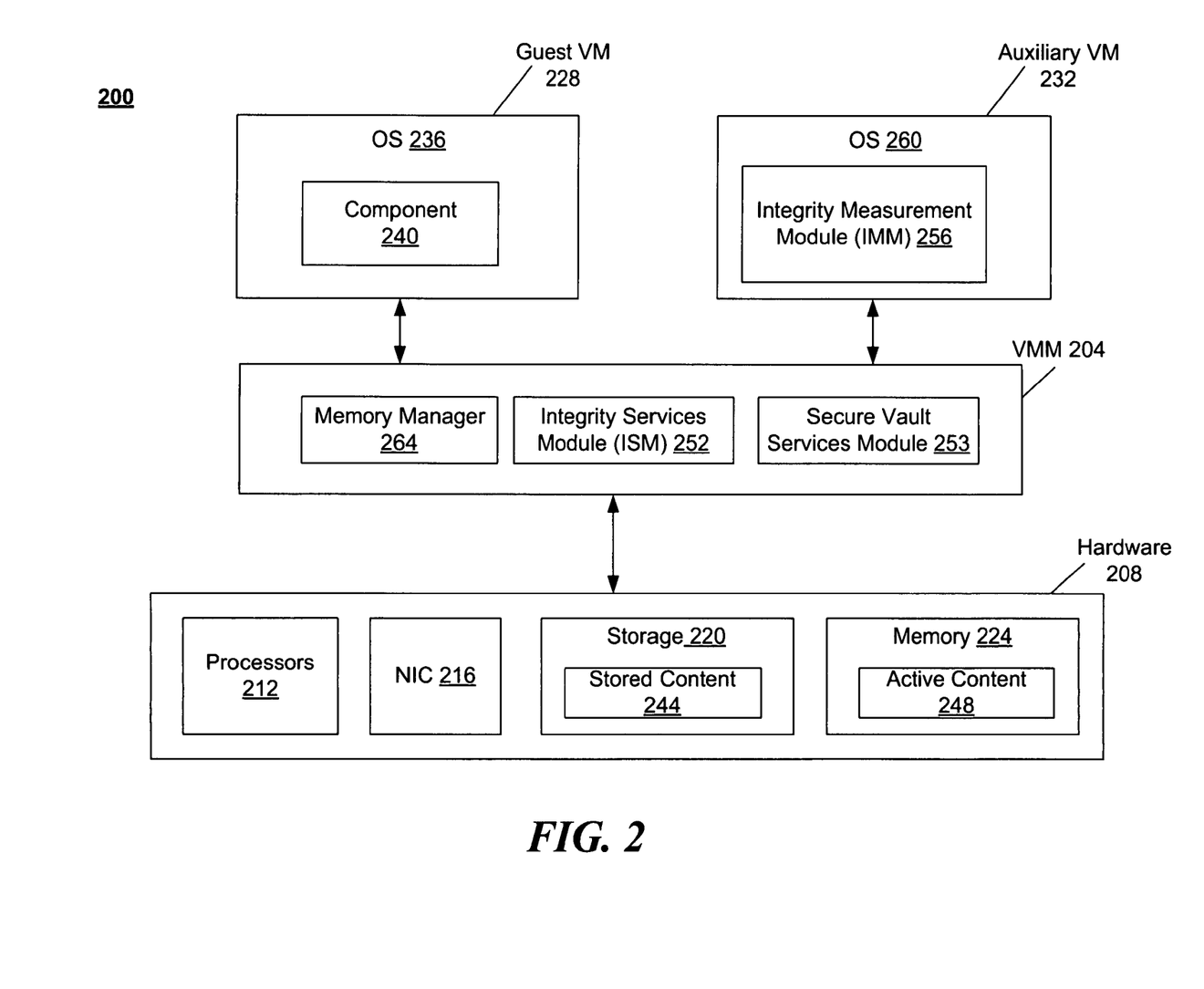
FIG. 2 illustrates a platform utilizing parallel execution environments, in accordance with an embodiment of the present invention.

FIG. 2 illustrates a platform 200 utilizing virtualization to provide parallel execution environments and protection services for components in accordance with an embodiment of this invention. In various embodiments, the platform 200 may be similar to, and substantially interchangeable with, the platform 100 of FIG. 1. Furthermore, elements described below may be similar to, and substantially interchangeable with, like-named elements described above, and vice versa.

In this embodiment a management module, e.g., virtual machine monitor (VMM) 204, on the platform 200 may present multiple abstractions and/or views of the platform hardware 208, e.g., one or more processor(s) 212, network interface controller (NIC) 216, storage 220, and/or memory 224, to the one or more independently operating execution environments, or "virtual machines (VMs)," e.g., guest VM 228 and auxiliary VM 232. The auxiliary VM 232 may be configured to execute code independently and securely isolated from the guest VM 228 and may prevent components of the guest VM 228 from performing operations that would alter, modify, read, or otherwise affect the components of the auxiliary VM 232. While the platform 200 shows two VMs, other embodiments may employ any number of VMs.

The components operating in the guest VM 228 and auxiliary VM 232 may each operate as if they were running on a dedicated computer rather than a virtual machine. That is, components operating in the guest VM 228 and auxiliary VM 232 may each expect to control various events and have complete access to hardware 208. The VMM 204 may manage VM access to the hardware 208. The VMM 204 may be implemented in software (e.g., as a stand-alone program and/or a component of a host operating system), hardware, firmware, and/or any combination thereof.

The guest VM 228 may include an OS 236 and component 240. Upon a designated event, the VMM 204 may identify and partition off portions of the component 240 to control access to the partitioned portions by the OS 236 or other components. One or more of these partitioned portions may be used to represent a content player to receive content from a content server. In various embodiments, a designated event may be when stored content 244 is loaded from storage 220 to memory 224, as active content 248 or when the component 240 requests protection. However, in various embodiments, other designated events may be additionally/alternatively used.

Component 240 may register with the VMM 204, and more particularly, with an integrity services module (ISM) 252 of the VMM 204 for protection. In various embodiments, the registration may take place upon an occurrence of a registration event, e.g., loading of the active content 248 into memory 224, periodically, and/or in some other event-driven manner. In various embodiments, the registration may be initiated by the component 240, another component within the VM 228, e.g., the OS 236, the VMM 204, or a component of the VM 232.

Upon receiving the registration, the ISM 252 may cooperate with an integrity measurement module (IMM) 256 operating in the VM 232 to authenticate and verify the integrity of the component 240. Authentication and verification of the integrity of the component 240 may help to prevent unauthorized modification and/or malicious termination, and may ensure that only recognized components may be afforded protection as defined by an administrator, user or other policy. The IMM 256 may operate in the VM domain 232 in the context of an OS 260, or in separate hardware and may, therefore, be largely independent of OS 236. By running outside of the context of the VM 228, the IMM 256 may have accurate and dependable memory measurement capabilities that may not be present, or possibly compromised, in the context of the OS 236.

The IMM 256 may provide the ISM 252 a response to the verification request such as pass, fail, pass w/qualification, fail w/qualification, etc. In various embodiments, qualifications may reflect degrees of integrity verification between pass and fail. The IMM 256 effectively identifies or authenticates the component and its data and assures that it is of the expected, correct form in memory.

In some embodiments, the active content 248 may include an integrity manifest, which may be a collection of information to be used in the verification of the integrity of the component 240. In various embodiments, the integrity manifest may include one or more integrity check values and/or relocation fix-up locations, covering the stored content 244, e.g., code store and/or static and/or configuration settings/data. The IMM 256 may access the integrity manifest from the active content 248 and verify that the component 240 corresponds, in total or in part, to the integrity manifest. The IMM 256 may verify the authenticity of the integrity manifest itself verifying a cryptographic signature over the integrity manifest structure to assure it is unaltered from its correct form. A comparison may be done of the images through, e.g., a byte-by-byte analysis or through analysis of cryptographic hashes.

In various embodiments, the IMM 256 may search for the active content 248 directly in the memory 224, e.g., through a direct memory access (DMA) or direct physical memory access. In various embodiments, the linear address of the component 240 may be provided to the IMM 256, e.g., through the ISM 252, and the IMM 256 may perform a virtual-to-physical mapping to identify the physical memory locations of the active content 248. In an embodiment, the VMM 204 may provide special interfaces to IMM 256 to provide access to active content 248.

In various embodiments, integrity measurement of the active content 248 may be conducted upon the initial registration, periodically, and/or in some other event-driven manner while the component 240 is executing. Integrity measurement upon initial registration request or a request for event processing may help to determine that the initial state of the active content 248 and/or stored content 244 is as expected based on the state of the content at the time it was manufactured, or loaded last. The periodic or event-driven integrity measurements may help to detect attacks that inappropriately change the protected attributes of the active content 248 and/or stored content 244.

Further details of integrity measurements of components are described in U.S. patent application Ser. No. 11/173,851, filed Jun. 30, 2005, and titled "Signed Manifest for Run-time Verification of Software Program Identity and Integrity;" U.S. patent application Ser. No. 11/322,669, filed on Dec. 30, 2005 and titled "Identifier Associated with memory Locations for Managing Memory Accesses;" and U.S. patent application Ser. No. 11/395,488, filed on Mar. 30, 2006 and titled "Intra-Partitioning of Software Components within an Execution Environment," all of which are incorporated herein by reference in their entirety.

Referring again to FIG. 2, ISM 252 may receive a response from IMM 256 reflecting verification of integrity and location in memory of the active content 248. If the verification fails, the ISM 252 denies the request and may trigger an alert. If the verification passes, the ISM 252 may cooperate with a memory manager 264 to intra-partition portions of the component 240 for protection services. Here, protection may be established around a vault or hidden pages in memory so they may only be accessed by the verified component and/or around the entirety of the component itself.

While FIG. 2 illustrates execution environments being virtual partitions, other embodiments may provide different execution environments through other mechanisms, e.g., using a service processor, protected execution mode (such as System Management Mode SMM or Secure Execution Mode SMX, for example) and/or an embedded microcontroller. In various embodiments, an auxiliary environment may be partitioned from a host environment via a variety of different types of partitions, including a virtualized partition (e.g., a virtual machine in a Virtualization Technology (VT) scheme), as shown above, and/or an entirely separate hardware partition (e.g., utilizing Active Management Technologies (AMT), "Manageability Engine" (ME), Platform Resource Layer (PRL) using sequestered platform resources, System Management Mode (SMM), and/or other comparable or similar technologies). In various embodiments, a VT platform may also be used to implement AMT, ME, and PRL technologies.

The platforms described above with reference to FIGS. 1 and 2 may be used to protect content received from a content server and to provide protection services for the receiving content player.

Figure 3:
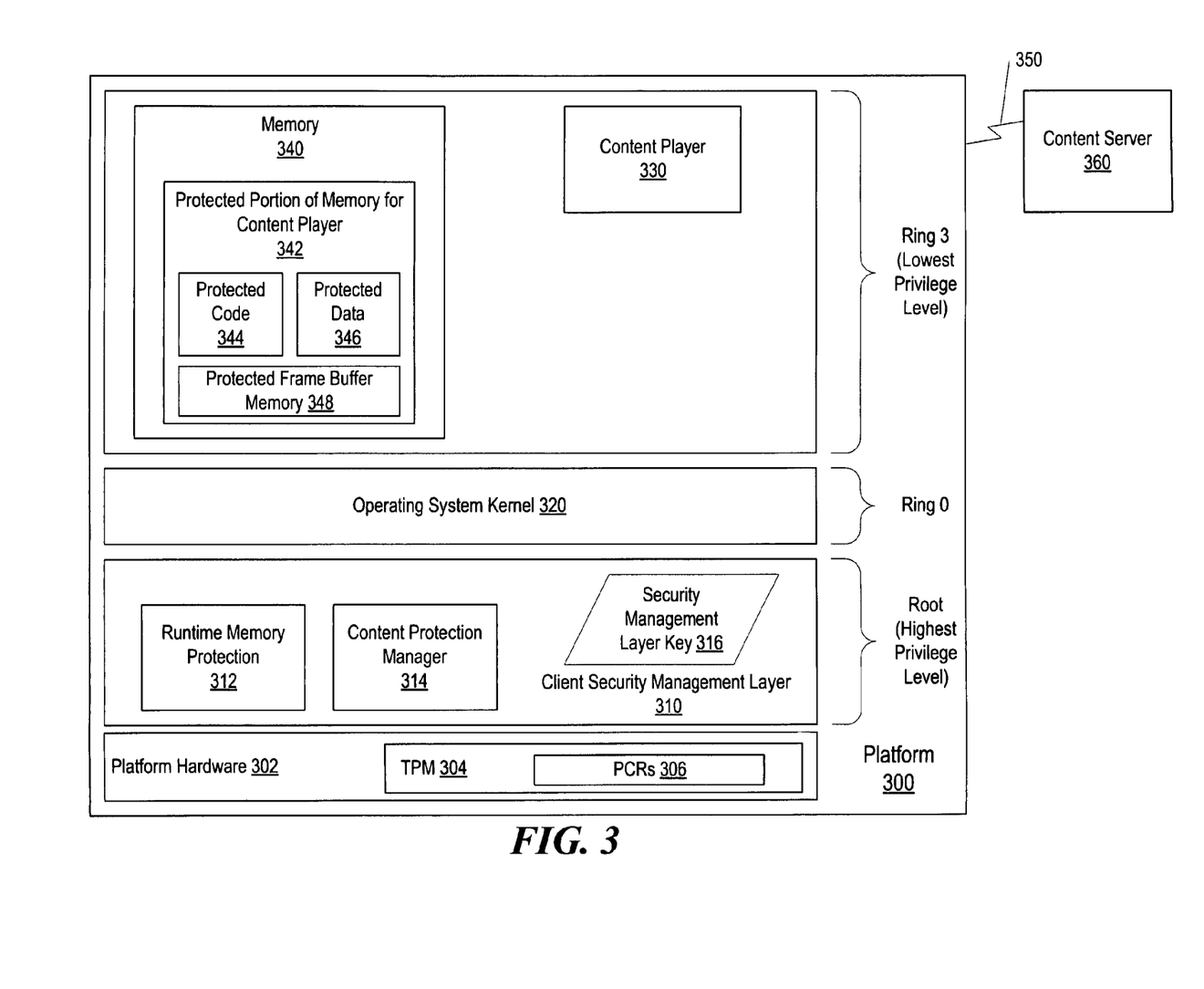
FIG. 3 is a block diagram showing an architecture for a secure platform in accordance with one embodiment of the invention.

FIG. 3 is a block diagram showing an architecture for a secure platform 300 in accordance with one embodiment of the invention. The secure platform 300 provides an attestation of its integrity to a remote processing system such as content server 360. This attestation of integrity includes attesting to the presence of a protected "known" content player 330 as well as protection against software known as "content rippers," which are designed to steal content. Content server 360 provides the encrypted content along with content keys to the "known" content player 330 that is integrity protected. Secure platform 300 includes a client security management layer 310 to protect the content and the content keys in the system memory 340. The content keys are released by client security management layer 310 only to an authorized "known" content player 330 whose code has been verified and confirmed.

Client security management layer 310 provides protection of the code, data and frame buffers of the content player within memory 340 in a protected portion of memory for content player 342. For example, protected code 344, protected data 346, and protected frame buffer memory 348 that are allotted by operating system kernel 320 for use by content player 330 can only be accessed by content player 330 and are isolated from other applications. Client security management layer 310 ensures that content cannot be "stolen" by intercepting the frames placed into frame buffers by content player 330, reading the memory 340, or reading a file from persistent storage or from a network channel such as communication link 350. Protected portion of memory for content player 342 is protected from access by unauthorized applications as well as from access by the operating system.

Secure platform 300 may use the capabilities of the client security management layer of patent application Ser. No. 11/229,126, described above, to measure and protect the client content player 330, the memory 340 used by the client content player 330 including protected frame buffer memory 348, and the data stored in memory 340, such as protected code 344 and protected data 346. In addition, secure platform 300 uses platform attestation by client security management layer 310 to assure content providers such as content server 360 that dynamic content will be protected on the client platform 300.

Secure platform 300 attests to a remote content server 360 that the content provisioned by the remote server cannot be copied in an unauthorized fashion even if the authorized user of the content is hostile or the client platform 300 has malware installed. This attestation can be provided because client security management layer 310 prevents unauthorized access to the memory 340 (using protected portion of memory for content player 342) in which the content is stored. In response to the attestation, content server 360 provisions the content encrypted with a content key to the client platform 300. Due to the protections afforded in the secure platform 300 by client security management layer 310, even an authorized user cannot make an illegitimate copy of the content with content ripping software.

In one embodiment, content player 330 is configured to transfer content keys from one platform to another platform without limiting the user to a particular hardware instance. This migration capability can be used in the event of a system failure, for example, so that a known and verified content player 330 can be reinstalled on different hardware. Such a migration would require that the new hardware platform be measured, verified and authenticated in addition to the required authentication of the content player 330. In another embodiment, secure platform 300 includes another authorized and protected application (not shown) configured to enable the transfer of content keys from an authorized content player 330 on one platform to another. The measurement and authentication of a platform is discussed in further detail below.

In one embodiment, secure platform 300 includes platform hardware 302 that is an Intel® Trusted Execution Technology (TXT) platform which provides hardware extensions to enhance the platform's security capabilities. Measured boot is enabled in the BIOS to provide platform attestation capabilities. By enabling measured boot, all instructions executing during the boot process beginning with a system reset instruction are measured and the measurements are recorded. The measurements can then be compared against a "gold standard" copy of the expected software and firmware to ascertain whether the instructions are consistent with the expected software and firmware.

Additionally, in one embodiment, platform hardware 302 includes a Trusted Platform Module (TPM) 304 that has been enabled by the user. The functionality of a TPM will be described generally, followed by a description of TPM 304 as it functions within platform 300. A TPM is a hardware component, typically a microcontroller, which resides within a processing system and provides various facilities and services for enhancing the security of the processing system. A TPM may be implemented in accordance with specifications such as the Trusted Computing Group (TCG) TPM Specification Version 1.2, dated Oct. 2, 2003 (hereinafter the "TPM specification"), which is available from the Internet at www.trustedcomputinggroup.org/home.

A TCG-compliant TPM stores keys, passwords, and digital certificates securely. A TPM provides core security technologies that can generate keys for use in digital certificates, create digital signatures, and provide encryption. Security operations are accessed and controlled through the secure subsystem using the defined interfaces. Applications like hard disk encryption, secure e-mail and identity/access management benefit from the security functions provided by the TPM.

A TPM attests to the identity and/or integrity of the platform, based on characteristics such as hardware components of the platform, including the processor(s) and chipset, as well as the software residing in the platform, such as the firmware and operating system. A TPM may also support auditing and logging of software processes, as well as verification of platform boot integrity, file integrity, and software licensing. A TPM is often described as providing a root of trust for a platform.

The TPM provides security functionality by storing information about the platform's configuration. This information can then be used for both of the TPM's primary functions, platform attestation and protected storage. The platform can provide information to a remote entity necessary to allow the remote entity to make decisions about the trustworthiness of the platform. The platform can also instruct the TPM to ensure that keys or sensitive data are only released while the system is in a known "good" configuration.

In order to store the platform state, a TPM uses Platform Configuration Registers (PCRs, such as PCRs 306 of TPM 304 of FIG. 3) to store measurements in the form of 160-bit SHA1 (secure hashing algorithm 1) hashes of software and configuration information for the platform. These measurements start at the boot block. Each boot component measures the next, records it in the TPM, and then launches that component until the operating system takes over the measurement of its core. Because each write to the PCRs adds a measurement to the register, rather than overwriting the previous measurement, no entity can change the measurement of its code made by the preceding component. Thus, a chain of measurements is made, such that if the beginning of the chain (known as the Root of Trust for Measurement) and each link are trustworthy, the entire chain is trustworthy.

Attestation refers to the set of TPM functions and protocols that enable the platform to report its configuration to a remote party in a trustworthy manner. For example, the TPM provides the ability to sign the PCRs used to store the platform state. For instance, a platform may use an attestation identity key (AIK) to sign the PCRs. Such signed PCRs may be referred to as a quote.

To provide proof to a remote entity that the quote was signed by a real TPM, each TPM has a set of credentials. For instance, an endorsement credential signed by the TPM manufacturer states that the TPM meets the TPM specification. The manufacturer also stores a unique key known as the endorsement key (EK) in the TPM, and the manufacturer uses the EK to sign the endorsement credential. Theoretically, the EK could be used directly to sign a quote of the PCRs. However, since the EK is unique, in some implementations, a third party is used instead, to provide privacy. Specifically, the platform uses a third party known as the privacy certification authority (CA) to create an identity credential for each AIK. TCG has defined a protocol that allows the TPM to prove to the privacy CA that the TPM is a real TPM, using the EK and the endorsement credential. In turn, the privacy CA creates identity credentials for AIKs that the TPM claims it owns.

Assuming a remote entity trusts the manufacturer of the TPM, the privacy CA, and the root of trust for measurement, a quote signed by an AIK that is accompanied by an identity credential is cryptographic proof of the current state of the platform. Another cryptographic protocol that may be used to enable remote authentication of a trusted platform is Direct Anonymous Attestation (DAA).

Another set of services the TPM provides is the secure storage of keys and other data. The TPM can create Rivest-Shamir-Adleman (RSA) keys, which it will only allow use of once (a) the requester provides authorization via a secret SHA1 hash and (b) the current configuration, as determined by the PCRs, indicates a "good" state. This function allows the platform to encrypt data such that, if the machine is compromised, booted from external media, or otherwise tampered with, the data will remain inaccessible.

To support services such as secure storage, the TPM creates keys with single-purpose types for different operations. The key of type EK is only available for decrypting identity credentials from the privacy CA. AIKs are used to sign other keys and to quote PCRs. Storage keys (SKs) are used to protect other keys or to "seal" data, which is a special encryption of data that protects the data with a password or PCR bindings. Binding keys (BKs) are used to encrypt arbitrary data, and to convert data into a TPM-bound data structure. Signing keys (SigKs) are used for signing arbitrary data.

Referring again to FIG. 3, in one embodiment, client security management layer 310 provides a platform attestation to content server 360 attesting that content received is protected. In response, content server 360 provides the encrypted content along with a content key that is encrypted. In one embodiment, the content key is encrypted with the public part of the Attestation Identifier Key (AIK) for client security management layer 310. The content, the encrypted content key and the content policy are sent to the client content player 330. The client content player 300 attests its integrity to client security management layer 310, and client security management layer 310 provides the decrypted content key to the authorized client content player 330 in protected memory 342. The provision of the decrypted content key by client security management layer 310 may take into account policies maintained by client security management layer 310 with respect to content player 330. The client content player 330 decrypts the content and renders the content to the protected frame buffer memory 348, which is within protected portion of memory for content player 342 that is protected for use by content player 330. As a result, content ripper software cannot steal the content from any of the persistent storage, memory 340, protected frame buffer memory 348, or the network channel 350. This mechanism precludes the need for expensive silicon gates for enabling encryption in the graphics hardware for content protection and works across discrete or integrated graphics adapters.

In one embodiment, TPM 304 of platform hardware 302 has an attestation identity key (AIK) for signing and an AIK for encryption. These AIKs may be stored in PCRs 306 and may be certified by a privacy certification authority or using Direct Anonymous Attestation (DAA). TPM 304 may also obtain an AIK specifically for client security management layer 310, shown as client security management layer key 316. Client security management layer 310 uses client security management layer key 316 to assert the trustworthiness of platform 300 to a remote processing system such as content server 360.

The role of client security management layer 310 in the architecture of platform 300 can be further understood by understanding that different architectural components within a computer system have different levels of access to resources. A protection ring is one of a set of hierarchical levels or layers of privilege within the architecture of a computer system. The use of privileges is generally hardware-enforced by some processor architectures that provide different processor modes at the firmware level. Rings are arranged in a hierarchy from most privileged (most trusted, usually numbered zero) to least privileged (least trusted, usually with the highest ring number). On most operating systems, ring 0 is the level with the most privileges and interacts most directly with the physical hardware such as the processor and memory. The Intel Virtualization Technology (VT-x) platform extends this concept to include a "root" privilege level that is more trusted than the ring-0 level. Code running at the root privilege level is measured upon booting the platform. In one embodiment, the root privilege level as shown in FIG. 3 is the root privilege level as defined in the Intel VT-x platform, although the invention is not so limited. It is envisioned that client security management layer 310 can be implemented using alternative virtualization technologies that can enable certain operations to occur at a privilege level that is more trusted than the ring-0 level used by traditional operating system kernel code.

Client security management layer 310 is shown in FIG. 3 as operating at the root privilege level, with higher privileges than an operating system kernel 320 operating at a ring-0 privilege level. The code for client security management layer 310 is measured upon booting platform 300. Consequently, after booting platform 300, TPM 304 PCR registers 306 have the SHA-1 hash values that include the measurements of the code for client security management layer 310. A client security management layer key 316 is generated for client security management layer 310 as an AIK by TPM 304.

In FIG. 3, operating system kernel 320 operates at a higher ring-0 privilege level than application programs such as content player 330, which operate at a ring-3 privilege level. By operating at the root privilege level, which is an even higher privilege level than ring-0, client security management layer 310 is capable of ensuring that the protected portion of memory for content player 342 within memory 340 is not accessible even to operating system kernel 320.

Client security management layer 310 includes a runtime memory protection component 312 and a content protection manager 314. Runtime memory protection component 312 protects both protected code 344 and protected data 346, as well as protected frame buffer memory 348, within the protected portion of memory for content player 342. Runtime memory protection component 312 may use the secure vault service functionality described in patent application Ser. No. 11/229,126, described above, to protect protected code 344, protected data 346, and protected frame buffer memory 348 within the protected portion of memory for content player 342. Protected code 344 may contain, for example, data link libraries, executable code, and other software related to a protected component such as content player 330. Protected data 346 may contain, for example, data such as content downloaded by content player 330 from content server 360 as well as encryption and decryption keys for the downloaded content. Similarly, protected frame buffer memory 348 is used by content player 330 to render content for display by the user. By restricting access to protected portion of memory for content player 342, runtime memory protection component 312 of client security management layer 310 provides protection in the event that operating system kernel 320 running at the ring-0 privilege level or other application programs running at the ring-3 privilege level become compromised.

Content protection manager 314 of client security management layer 310 uses the security features provided by TPM 304 of platform hardware 302 to attest to the trustworthiness of platform 300. For example, client security management layer 310 uses client security management layer key 316, which may be, for example, an AIK generated by TPM 304, to assert the trustworthiness of platform 300 to a remote processing system such as content server 360. The operation of content protection manager 314 of client security management layer 310 is described in further detail below.

Figure 4:
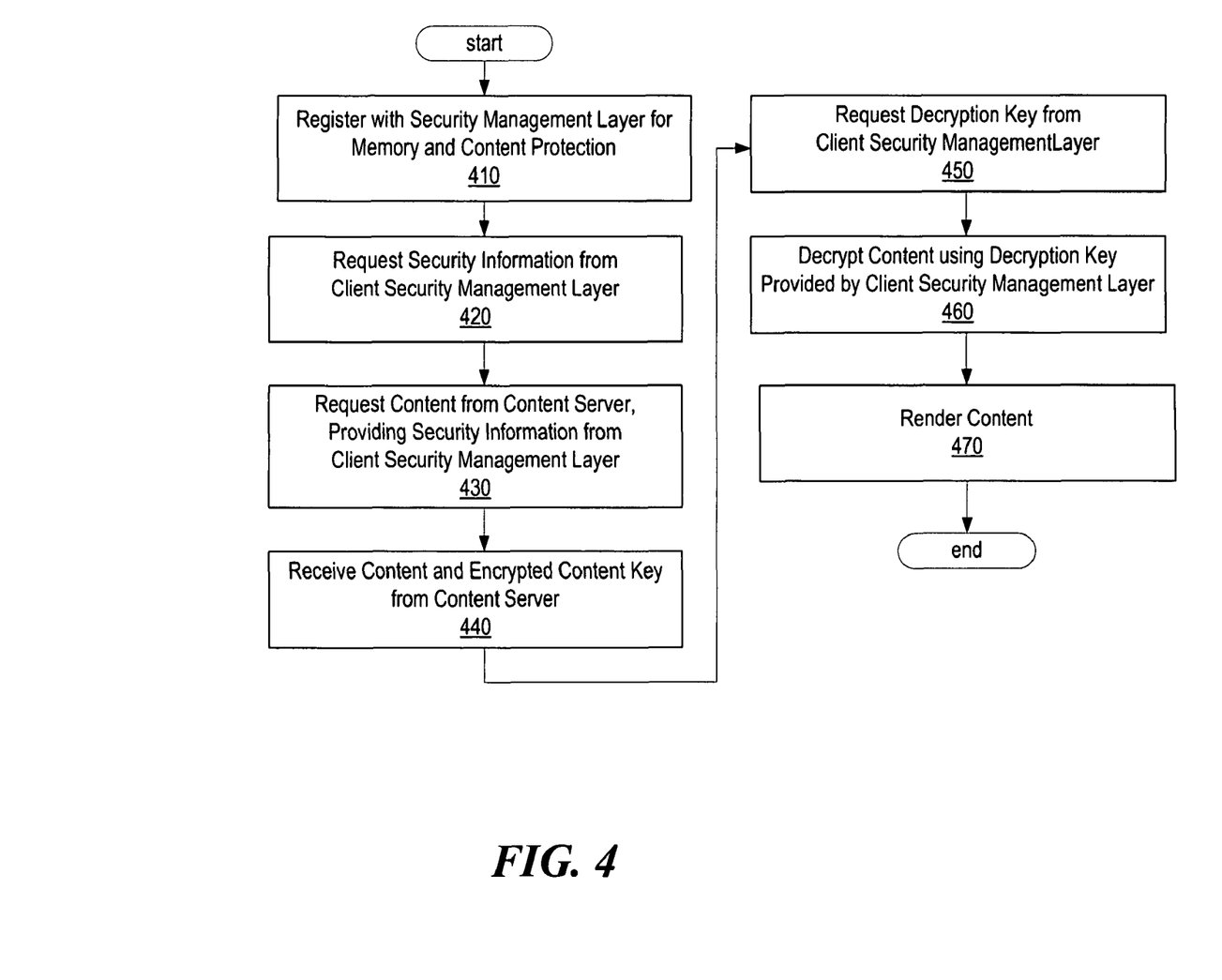
FIG. 4 is a flowchart of a method of operation of a content player, such as the content player of FIG. 3, configured to operate in an environment provided by the secure platform architecture of FIG. 3.

FIG. 4 is a flowchart of a method of operation of a content player, such as content player 330 of FIG. 3, configured to operate in an environment provided by the secure platform architecture of FIG. 3. The actions performed with reference to FIG. 4 are described as being performed by the components of FIG. 3. Upon startup, content player 330 transitions to "Register with Client Security Management Layer for Memory and Content Protection" step 410. In this step, content player 330 invokes hypercalls to client security management layer 310 to provide a protected portion of memory 342 to protect its code and data, including its dynamic link libraries as well as the frame buffer memory 348 to be used for rendering content. These hypercalls to client security management layer 310 may invoke the secure vault services outlined in patent application Ser. No. 11/229,126, referenced above. Once client security management layer 310 has provided this protection to content player 330, such as by providing protected portion of memory for content player 342, the protected code 344, protected data 346, and protected frame buffers 348 for content player 330 cannot be accessed by any ring-0 or ring-3 component that does not have the same access permissions from client security management layer 310 as content player 330.

As part of the registration process with client security management layer 310, a manifest for content player 330 may be created, along with an application identifier. This manifest may be created in accordance with patent application Ser. No. 11/173,851, filed on Jun. 30, 2005 and entitled "Signed Manifest for Run-Time Verification of Software Program Identity and Integrity," referenced above. The manifest may contain information that can be used to verify the integrity of content player 330 and may be used by client security management layer 310 to confirm the integrity of content player 330 in subsequent interactions.

Referring again to FIG. 4, after initially registering with client security management layer 310 in "Register with Client Security Management Layer for Memory and Content Protection" step 410, content player 330 transitions to "Request Security Information from Client Security Management Layer" step 420. In one embodiment, the security information requested by content player 330 includes the PCR values for client security management layer 310. In response to the request for security information, client security management layer 310 provides a signed blob that contains the PCR values of the specific PCR registers in the TPM. The blob is signed using the AIK-Signature Key. The blob also contains the public part of the AIK-Encryption key of the client security management layer 310 and the certificates received from the privacy certification authority. In the embodiment described here, security information is described as being managed in accordance with an AIK-based encryption scheme. One of ordinary skill in the art will understand that security information may alternatively be managed using other schemes, such as Direct Anonymous Attestation, which protects the user's privacy.

From "Request Security Information from Client Security Management Layer" step 420, content player 330 transitions to "Request Content from Content Server, Providing Security Information from Client Security Management Layer" step 430. Content player 330 uses the security information provided by client security management layer 310 to attest to content server 360 that platform 300 is secure. The content request contains the user credentials for the content player's account with the content server, the signed blob received from the client security management layer 310, and the policy parameters requested for the content. For example, the policy parameters may indicate the number of times a user is allowed to play a video of the content before the user's license to play the video expires. Processing of the request for content by content server 360 is described in further detail with reference to FIG. 5.

From "Request Content from Content Server, Providing Security Information from Client Security Management Layer" step 430, content player 330 transitions to "Receive Content and Encrypted Content Key from Content Server" step 440. Content player 330 receives a packaged blob from content server 360, which includes encrypted content and an encrypted content key. Content player 330 then transitions to "Request Decryption Key from Client Security Management Layer" step 450. Content player 330 passes the encrypted content key (described in further detail below with reference to FIG. 5), along with its own application identifier, to client security management layer 310. Processing of the encrypted content key by client security management layer 310 is discussed in further detail below with reference to FIG. 6.

In response to "Request Decryption Key from Client Security Management Layer" step 450, content player 330 receives a decryption key with which content player 330 can decrypt the encrypted content provided by content server 360. Content player 330 proceeds to "Decrypt Content using Decryption Key Provided by Client Security Management Layer" step 460 and decrypts the content provided by content server 360. Content player 330 loads the encrypted content into protected portion of memory for content player 342 and decrypts the content using the decryption key. Content player 330 proceeds to "Render Content" step 470, where content player 330 renders the decrypted content on the protected frame buffers using standard application program interfaces that are included in protected code 344. The decrypted content is written directly into protected data 346 within protected portion of memory for content player 342 instead of making calls to the operating system kernel 320 to render the content.

Figure 5:
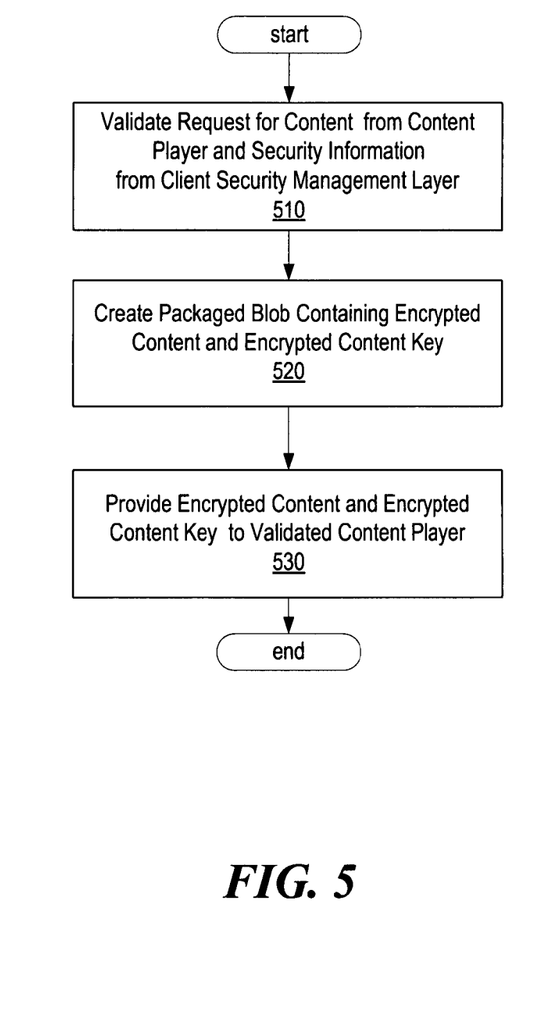
FIG. 5 is a flowchart of a method of operation of a content server configured to operate in conjunction with an environment provided by the secure platform architecture of FIG. 3.

FIG. 5 is a flowchart of a method of operation of a content server configured to operate in conjunction with a secure platform of the present invention. In response to receiving a request for content from content player 330, content server 360 validates the request, as shown in "Validate Request for Content from Content Player and Security Information from Client Security Management Layer" step 510. For example, content server 360 may validate the certificates of client security management layer 310 provided in the signed blob against a root certificate of the privacy certificate authority. Subsequently, content server 360 may compare the hash values of the PCR register with a gold standard copy of the hash values, thereby establishing the validity of client security management layer 310. In addition, content server 360 may authenticate the user credentials for content player 330 against a user database as well as examine the policy parameters provided as part of the request. Content may be provided, for example, in accordance with whichever policy is more restrictive when comparing values in the policy provided in the content request with values for the user's policy stored in a service database.

From "Validate Request for Content from Content Player and Security Information from Client Security Management Layer" step 510, content server 360 transitions to "Create Packaged Blob Containing Encrypted Content and Encrypted Content Key" step 520. In one embodiment, content server 360 encrypts the content in a symmetric key called the content key (CK) and encrypts CK, Content Policy (CP) and the application-identifier (AI) in the AIK-encryption key of the client security management layer 310. For example, in this embodiment, the packaged blob is created using a service key for content server 360 as follows:

BLOB=Sign service-key (E CK(Content)||E AIK-Encryption(CK||CP||AI))

In this formula, the blob is created by using a signed service key to encrypt a concatenated string made up of two components. The first component encrypts the content using the content key, and the second component encrypts a concatenated string of the content key, content policy, and attestation identifier with the attestation identification key. The packaged blob is sent back to the content player 330 in "Provide Encrypted Content and Encrypted Content Key to Validated Content Player" step 530.

Figure 6:
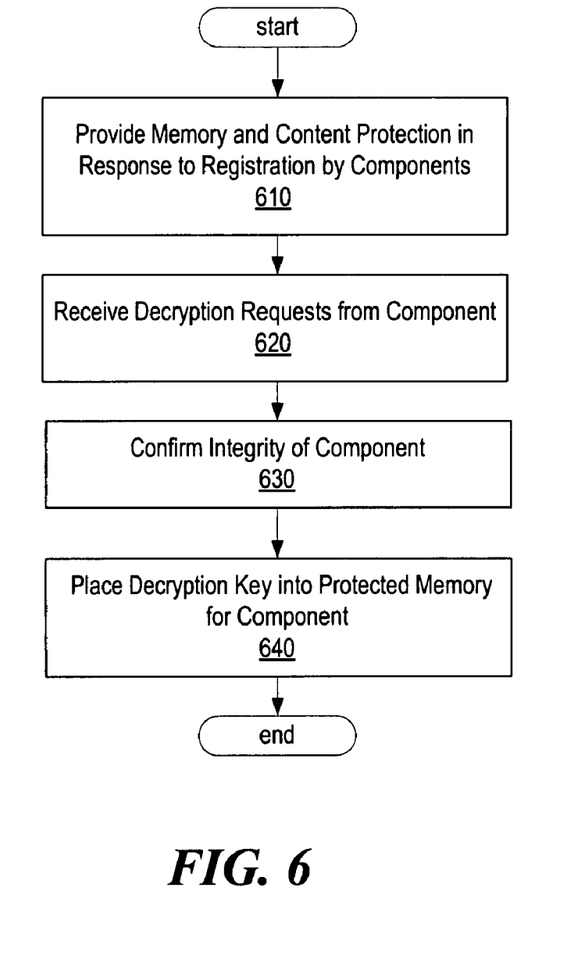
FIG. 6 is a flowchart of a method of operation of a client security management layer configured to provide the secure platform architecture of FIG. 3.

FIG. 6 is a flowchart of operation of a client security management layer to provide the secure platform architecture of FIG. 3. Client security management layer 310 responds to registration requests by application programs as described with reference to "Register with Client Security Management Layer for Memory and Content Protection" step 410 of FIG. 4. In response to such a registration request, client security management layer 310 transitions to "Provide Memory and Content Protection in Response to Registration by Components" step 610. Memory protection may be provided as described above with reference to runtime memory protection component 312 of client security management layer 310. As mentioned above, runtime memory protection component 312 of client security management layer 310 protects protected code 344, protected data 346, and protected frame buffer memory 348 within the protected portion of memory for content player 342. Runtime memory protection component 312 may use the secure vault service functionality described in patent application Ser. No. 11/229,126, described above, to protect protected code 344, protected data 346, and protected frame buffer memory 348 within the protected portion of memory for content player 342.

Content protection may be provided by content protection manager 314 of client security management layer 310, although the services provided with respect to FIG. 6 are described as being performed by client security management layer 310. Client security management layer 310 may receive decryption requests from components, as shown in "Receive Decryption Requests from Component" step 620. In response to such a decryption request, client security management layer 310 may transition to "Confirm Integrity of Component" step 630. In confirming the integrity of components, client security management layer 310 may validate the application identifier provided by content player 330 in the decryption request against the application identifier provided by content server 360 in the packaged blob. Client security management layer 310 may further perform other integrity measurements to validate the integrity of content player 330, such as validating a manifest for content player 330, prior to providing the decryption key to content player 330.

In response to confirming the integrity of a component, client security management layer 310 may decrypt the content key and other parameters provided by content server 360 in the packaged blob returned to content player 330. Client security management layer 310 may validate the decryption request against the content policy and may also register the policy information from the packaged blob in a policy database (using an unprotected ring-3 application). By validating the decryption request against the content policy prior to providing the decrypted content key to content player 330, client security management layer 310 can enforce policies required by the providing content server 360 after the content has been delivered, even if the client content player 330 is no longer connected to the network for the content server 360.

From "Confirm Integrity of Component" step 630, control then transitions to "Place Decryption Key into Protected Memory for Component" step 640, where client security management layer 310 and/or the runtime memory protection component 312 of client security management layer 310 places the decryption key into the protected portion of memory for the component, such as the protected portion of memory for content player 342.

The outlined mechanism provides content protection on the platform using standard features without the need for additional hardware. Since it uses sound cryptographic techniques by putting the protector at a higher level of privilege than the protected component (i.e., the content player), the protection services provided by the client security management layer of the present invention are harder to circumvent than the other obfuscation based techniques. The outlined mechanism enables remote content service providers to distribute content to the clients with a high degree of resilience against attackers. This mechanism is un-intrusive and does not need a modification of the platform hardware, operating system or additional drivers.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device.

Program code may be applied to input data to perform the functions described herein and generate output information. Embodiments of the invention also include machine-accessible media containing instructions for performing the operations of the invention or containing design data, such as HDL, which defines structures, circuits, apparatuses, processors and/or system features described herein. Such embodiments may also be referred to as program products.

Such machine-accessible storage media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language.

Presented herein are embodiments of methods and systems for providing a secure platform to protect content received from a content server. While particular embodiments of the present invention have been shown and described, it will be obvious to those skilled in the art that numerous changes, variations and modifications can be made without departing from the scope of the appended claims. Accordingly, one of skill in the art will recognize that changes and modifications can be made without departing from the present invention in its broader aspects. The appended claims are to encompass within their scope all such changes, variations, and modifications that fall within the true scope and spirit of the present invention.

What is claimed is:

1. A method comprising:
controlling, using a client security management layer, access to a protected portion of a memory of a computer system on behalf of a component, the protected portion of the memory provided by the client security management layer and accessible only to the component;
receiving an encrypted content key from the component, the encrypted content key received with content received by the component from a content provider;
confirming the integrity of the component;
decrypting the encrypted content key to provide a decrypted content key; and
placing the decrypted content key in the protected portion of the memory in response to confirming the integrity of the component so that the component can decrypt the content and render the content in the protected portion of the memory.

2. The method of claim 1 wherein the controlling the access to the protected portion of the memory comprises preventing access by an operating system for the computer system to the protected portion of the memory while allowing access to the protected portion of the memory by the component.

3. The method of claim 1 further comprising:
receiving a decryption request for specific content from the component; and
determining that a content policy for the specific content allows decryption of the specific content prior to decrypting the encrypted content key.

4. The method of claim 3 wherein determining that a content policy for the specific content allows decryption of the specific content is performed without a connection to a content server that provided the specific content.

5. The method of claim 1, wherein confirming the integrity of the component comprises validating an application identity provided by the component against an application identity provided by the content server.

6. The method of claim 1, further comprising:
receiving a signed blob including platform configuration register (PCR) values of a trusted platform module (TPM) of the computer system, an encryption key of the client security management layer, and a certificate, wherein the component is to provide the signed blob to the content server with a request for the content.

7. The method of claim 1, wherein the client security management layer operates at a root privilege level, and the component operates at a privilege level, the root privilege level having a higher privilege than an operating system (OS) kernel at a second privilege level different than the root privilege level.

8. The method of claim 1, further comprising transferring the decrypted content key from the computer system to a second computer system.

9. The method of claim 1, further comprising migrating the component from the computer system to a second computer system.

10. A method comprising:
registering a content player as a component with a client security management layer to receive protection of a protected portion of a memory of a computer system;
receiving encrypted content and an encrypted content key from a content provider responsive to a request by the component including a signed blob having platform configuration register (PCR) values of a trusted platform module (TPM) of the computer system, an encryption key of the client security management layer, and a certificate;
providing the encrypted content key from the component to the client security management layer, wherein the client security management layer confirms the integrity of the component, decrypts the encrypted content key to provide a decrypted content key, and places the decrypted content key into the protected portion of the memory; and
decrypting the encrypted content by the component and rendering the decrypted content into the protected portion of the memory using the decrypted content key.

11. The method of claim 10, further comprising:
providing an attestation to the content provider that received content is protected from unauthorized copying.

12. The method of claim 11 wherein the attestation comprises identification information for the client security management layer.

13. The method of claim 10, wherein rendering the decrypted content includes rendering the decrypted content on protected frame buffers of the protected portion of the memory using an application program interface of protected code of the protected portion of the memory without calling an operating system (OS) kernel to render the decrypted content.

14. A computer system comprising:
a processor;
a memory coupled to the processor;
a client security management layer configured to:
control, using the client security management layer, access to a protected portion of the memory on behalf of a component running on the processor, the protected portion of the memory provided by the client security management layer and accessible only to the component;
receive an encrypted content key from the component, the encrypted content key received with content received by the component from a content provider;
confirm the integrity of the component;
decrypt the encrypted content key to provide a decrypted content key; and
place the decrypted content key in the protected portion of the memory in response to confirming the integrity of the component so that the component can decrypt the content and render the content in the protected portion of the memory.

15. The computer system of claim 14 wherein the client security management layer is further configured to control the access to the protected portion of the memory by preventing access by an operating system for the computer system to the protected portion of the memory while allowing access to the protected portion of the memory by the component.

16. The computer system of claim 14 wherein the client security management layer is further configured to control the access to the protected portion of the memory by preventing access by an unauthorized application running on the computer system to the protected portion of the memory.

17. The computer system of claim 14 wherein the client security management layer is further configured to receive a decryption request for specific content from the component; and
determine that a content policy for the specific content allows decryption of the specific content prior to decrypting the encrypted content key.

18. The computer system of claim 17 wherein the client security management layer is further configured to determine that a content policy for the specific content allows decryption of the specific content without a connection to the content server that provided the specific content.

19. The computer system of claim 14 wherein the client security management layer is further configured to confirm the integrity of the component by validating a manifest for the component.

20. The computer system of claim 14 wherein the client security management layer is further configured to confirm the integrity of the component by confirming that code for the component matches a standard for the code for the component.

21. A computer system comprising:
a processor;
a memory;
a client security management layer; and
a content player configured to register the content player as a component with the client security management layer to receive protection of a protected portion of the memory, receive encrypted content and an encrypted content key from a content provider responsive to a request by the component including a signed blob having platform configuration register (PCR) values of a trusted platform module (TPM) of the computer system, an encryption key of the client security management layer, and a certificate, provide the encrypted content key from the component to the client security management layer, wherein the client security management layer confirms the integrity of the component, decrypts the encrypted content key to provide a decrypted content key, and places the decrypted content key into the protected portion of the memory, and decrypt the encrypted content by the component and render the decrypted content into the protected portion of the memory using the decrypted content key.

22. The computer system of claim 21, wherein the content player is further configured to provide an attestation to the content provider that received content is protected from unauthorized copying.

23. The computer system of claim 22 wherein the attestation comprises identification information for the client security management layer.

24. A non-transitory computer-readable storage medium comprising:
instructions configured to:
control, using a client security management layer, access to a protected portion of a memory of a computer system on behalf of a component running on the computer system, the protected portion of the memory provided by the client security management layer and accessible only to the component;

receive an encrypted content key from the component, the encrypted content key received with content received by the component from a content provider;

confirm the integrity of the component;

decrypt the encrypted content key to provide a decrypted content key; and place the decrypted content key in the protected portion of the memory in response to confirming the integrity of the component so that the component can decrypt the content and render the content in the protected portion of the memory.

25. The non-transitory computer-readable storage medium of claim 24 wherein the decrypted content key corresponds to content received by the component from a content provider; and the component uses the decrypted content key to decrypt the content.

26. The non-transitory computer-readable storage medium of claim 24 wherein the instructions are further configured to receive a decryption request for specific content from the component; and determine that a content policy for the specific content allows decryption of the specific content prior to decrypting the encrypted content key.

27. The non-transitory computer-readable storage medium of claim 24 wherein the instructions are further configured to determine that a content policy for the specific content allows decryption of the specific content without a connection to the content server that provided the specific content.

28. The non-transitory computer-readable storage medium of claim 24 wherein the instructions are further configured to confirm the integrity of the component by validating a manifest for the component.

29. The non-transitory computer-readable storage medium of claim 24 wherein the instructions are further configured to confirm the integrity of the component by confirming that code for the component matches a standard for the code for the component.

30. A non-transitory computer-readable storage medium comprising:

instructions configured to:

register a content player as a component with a client security management layer of a computer system to receive protection of a protected portion of a memory of the computer system;

receive encrypted content and an encrypted content key from a content provider responsive to a request by the component including a signed blob having platform configuration register (PCR) values of a trusted platform module (TPM) of the computer system, an encryption key of the client security management layer, and a certificate;

provide the encrypted content key from the component to the client security management layer, wherein the client security management layer confirms the integrity of the component, decrypts the encrypted content key to provide a decrypted content key, and places the decrypted content key into the protected portion of the memory; and decrypt the encrypted content by the component and render the decrypted content into the protected portion of the memory using the decrypted content key.

31. The non-transitory computer-readable storage medium of claim 30, wherein the instructions are further configured to provide an attestation to the content provider that received content is protected from unauthorized copying.

32. The non-transitory computer-readable storage medium of claim 31 wherein the attestation comprises identification information for the client security management layer.

\* \* \* \* \*